United States Patent [19]

Paton

[11] Patent Number: 4,957,277

[45] Date of Patent: Sep. 18, 1990

[54] TUBULAR ELASTOMERIC SPRING HAVING CONTROLLABLE BREAKOVER AND SPRING RATE

[76] Inventor: H. N. Paton, 1218 Third Ave., Suite 1018, Seattle, Wash. 98121

[21] Appl. No.: 471,040

[22] Filed: Jan. 26, 1990

Related U.S. Application Data

[63] Continuation of Ser. No. 304,886, Jan. 31, 1989, abandoned, which is a continuation of Ser. No. 61,481, Jun. 15, 1987, abandoned.

[51] Int. Cl.$^5$ .............................................. F16F 3/10
[52] U.S. Cl. ...................................... 267/33; 267/152; 280/715
[58] Field of Search ................ 267/33, 292, 293, 144, 267/152, 153; 280/215, 697; 248/565, 634

[56] References Cited

U.S. PATENT DOCUMENTS

| | | | |
|---|---|---|---|
| 1,869,793 | 8/1932 | Bailey | 367/35 X |
| 1,936,389 | 11/1933 | Halquist | 267/33 |
| 2,005,089 | 6/1935 | Krebs | 267/33 |
| 2,230,069 | 1/1941 | Rushmore | 267/33 |
| 2,588,171 | 3/1952 | Smith et al. | 267/33 |
| 2,605,099 | 7/1952 | Brown | 267/33 |
| 2,755,100 | 7/1956 | Giacosa | 280/716 |
| 2,822,165 | 2/1958 | Boschi | 267/33 |
| 3,030,099 | 4/1962 | Piatscheck | 267/292 X |
| 3,037,764 | 6/1962 | Paulsen | 267/292 |
| 3,188,659 | 1/1964 | Paulsen | 267/33 |
| 3,279,779 | 10/1966 | Thomas et al. | 267/292 |
| 3,412,990 | 11/1968 | Gladstone | 267/292 X |
| 3,447,814 | 6/1969 | Siber et al. | 280/124 |
| 4,355,579 | 10/1986 | Fukuda et al. | 267/153 |

FOREIGN PATENT DOCUMENTS

| | | |
|---|---|---|
| 160851 | 4/1954 | Australia . |
| 45497 | 2/1982 | European Pat. Off. . |
| 184848 | 6/1986 | European Pat. Off. ............. 267/33 |
| 662622 | 7/1938 | Fed. Rep. of Germany . |
| 2310656 | 9/1974 | Fed. Rep. of Germany ........ 267/33 |
| 1116719 | 5/1956 | France ................. 267/292 |
| 1331206 | 5/1963 | France ................. 267/292 |
| 1440023 | 8/1966 | France . |
| 2456260 | 1/1981 | France ................. 267/141 |
| 52-24676 | 2/1977 | Japan . |
| 58-118344 | 7/1983 | Japan . |
| 755186 | 8/1956 | United Kingdom . |
| 755808 | 8/1956 | United Kingdom . |
| 1437525 | 5/1976 | United Kingdom . |

OTHER PUBLICATIONS

Rowland, "Suspension Simplicity from Paton," Automotive News, Jul. 28, 1986, at 32.

The Paton Corp., "The Electronic Suspension Revolution and the Paton Dry-Namic ® (Non-Hydraulic) Suspensions," Jun. 1986.

Gieck et al., "The 'Marsh Mellow' Spring," SAE Technical Paper 820,161, Feb. 22, 1982.

Moulton et al., "Rubber Springs for Vehicle Suspension," Published by the Institute of Mechanical Engineering, 1956.

*Primary Examiner*—George E. A. Halvosa
*Attorney, Agent, or Firm*—Finnegan, Henderson, Farabow, Garrett & Dunner

[57] ABSTRACT

The outer profile of the spring is shaped to control breakover (i.e., the change in spring deflection from constant to rising rate) and spring rate. A process for inducing breakover in thick-walled elastomeric springs which normally have no breakover, and for controlling breakover, whether so induced or occurring naturally, as well as spring rate, is disclosed.

16 Claims, 3 Drawing Sheets

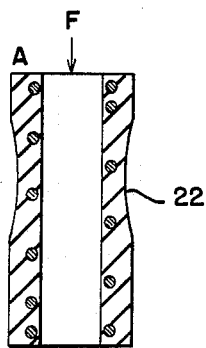
FIG.11
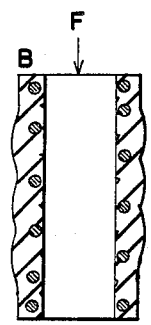
FIG.12
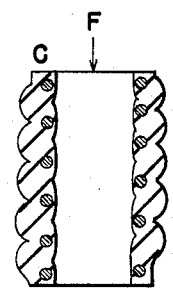
FIG.13
FIG.14
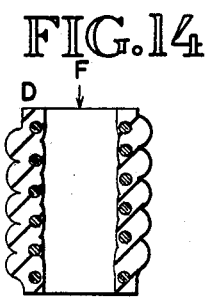
FIG.15
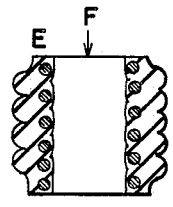
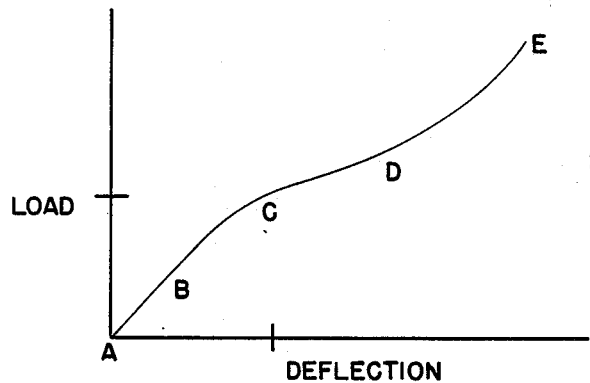
FIG.16
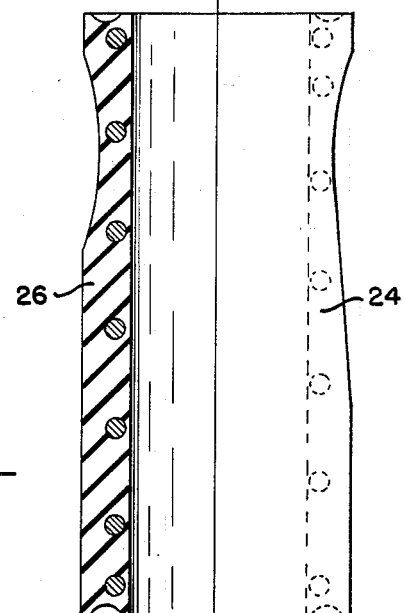
FIG.17

TUBULAR ELASTOMERIC SPRING HAVING CONTROLLABLE BREAKOVER AND SPRING RATE

This application is a continuation, of application Ser. No. 304,886, filed Jan. 31, 1989,which is a continuation of application Ser. No. 061,481, filed June 15, 1987, both now abandoned.

BACKGROUND OF THE INVENTION

This invention relates to tubular elastomeric springs, and, more particularly to tubular elastomeric springs which provide both constant and rising spring rates. As used herein, the term "breakover" means the change in spring deflection from constant to rising rate.

Cylindrical elastomeric springs typically provide only constant rate or rising rate deflection, not both. Those cylindrical elastomeric springs which provide both constant and rising rate deflection, moreover, have unsatisfactory breakovers. These springs therefore tend to be unacceptable for applications which require rising rate performance above a certain load and constant rate performance below it.

Such applications typically involve lightweight passenger vehicles, for example, in which hood height requirements, suspension strut lengths, and other environmental factors effectively limit the operational length of the spring. In order to meet these requirements, yet provide the requisite load bearing capacity, the spring often has to be constructed with such thick walls that it has no breakover at all. Consequently, the performance versatility which could have been obtained from having both constant and rising rate performance is lost.

SUMMARY OF THE INVENTION

Accordingly, a principal object of this invention is to provide a process for making a cylindrical elastomeric spring in which breakover is controllable.

Another object of this invention is to provide a process for inducing and controlling breakover in a thick-walled cylindrical elastomeric spring.

Another object of this invention is to provide a process for controlling the spring rate which accompanies and follows breakover of a cylindrical elastomeric spring.

These objects are accomplished in accordance with the principles of this invention by providing a process which includes the steps of forming a first portion of a tubular elastomeric spring with a tubular bore and a generally straight-sided outer profile. A second portion of the spring is formed with a tubular bore which conforms to the bore of the first portion. To control the occurence of breakover, the outer profile of this second portion is shaped with respect to the outer profile of the first portion such that the second portion will bulge outwardly to a greater extent than the first portion, causing breakover, at a predetermined load. Preferably, this outer profile is formed by one or more annular grooves having depths and lengths selected in relation to the breakover and spring rate effects desired.

According to further principles of this invention, the exterior surface of a tubular elastomeric spring may be thus shaped at one or more locations along a major or minor portion of its axial length, depending upon the breakover point and subsequent rising spring rate desired. In addition, it may be thus shaped either symmetrically to or eccentric with the longitudinal axis of the spring, depending upon whether the load is to be applied axially or non-axially and other factors. Any suitable method may be used to accomplish such shaping, including in situ molding, compression molding, transfer molding, injection molding, or appropriate contouring or profiling of pre-formed blanks.

Thus, it will be appreciated from the foregoing summary that this invention may be used to induce breakover in those thick-walled tubular elastomeric springs which normally do not exhibit any breakover. When such breakover is obtained, whether by such shaping or naturally, this invention may be used to control breakover so that it occurs at a desired load and deflection. In addition, this invention may be used to control the spring effects which accompany and follow breakover.

These and other features, objects, and advantages of the present invention will become apparent from the detailed description and claims to follow, taken in conjunction with the accompanying drawings in which like parts bear like reference numerals.

BRIEF DESCRIPTION OF THE DRAWINGS

FIGS. 11-15 are schematics depicting axial compression of a cylindrical elastomeric spring made in accordance with the present invention;

FIG. 16 is a graph of load versus deflection of the FIGS. 11-15 springs;

FIG. 17 is a longitudinal section of an eccentrically contoured elastomeric spring made in accordance with this invention.

DETAILED DESCRIPTION OF THE DRAWINGS

Figure 2:
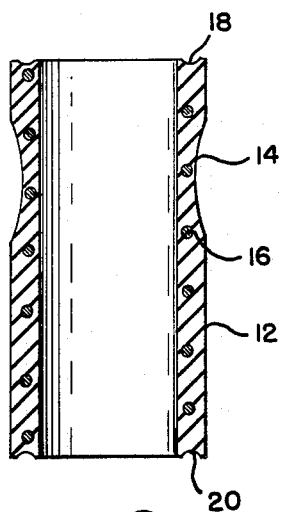
FIG. 2 is a section taken along the line 2-2 in FIG. 1.
Figure 1:
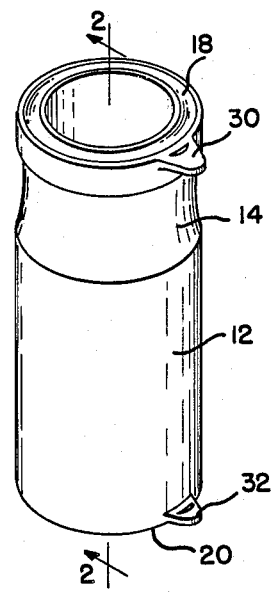
FIG. 1 is a perspective of one presently preferred embodiment of a cylindrical elastomeric spring made according to this invention.
Figure 3:
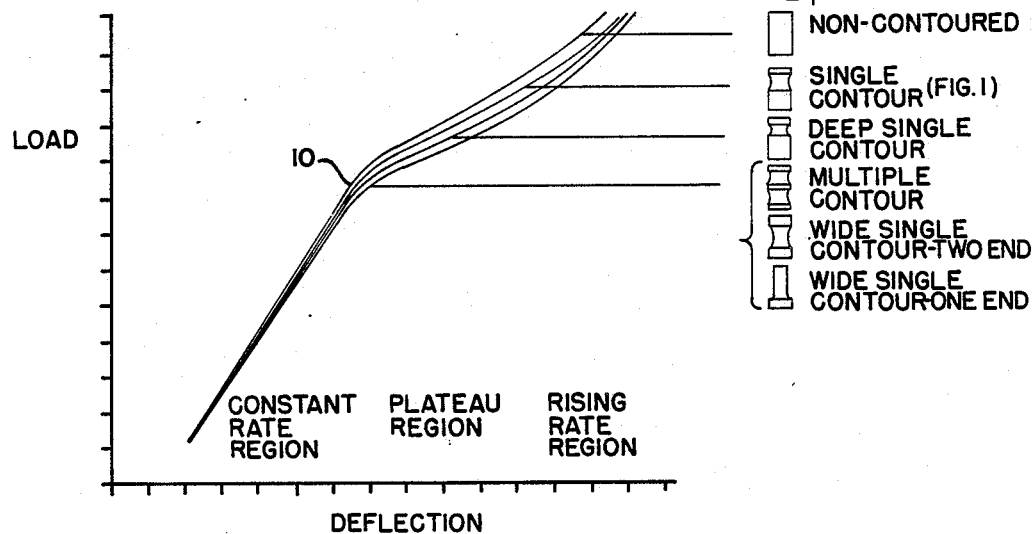
FIG. 3 is a graph of load versus deflection of the FIG. 1 spring and other springs made in accordance with this invention.

Referring to FIGS. 1-3, one presently preferred embodiment of the tubular elastomeric spring of this invention provides a load versus deflection curve, such as that depicted in FIG. 3, made up of a generally constant rate region, a generally rising rate region and an intermediate plateau region. In the example, breakover of the FIG. 1 spring occurs at the knee of the FIG. 3 curve (generally referenced by numeral 10).

The FIG. 1 spring is made by the process of forming a first portion of the spring (generally designated by numeral 12 in FIGS. 1 and 2) with a generally cylindrical inner bore and a generally straight sided outer profile. A second portion of the spring, (generally referenced by numeral 14 in FIGS. 1 and 2) has an inner bore which conforms to the inner bore of portion 12. Unlike prior tubular elastomeric springs or the processes for making them, this invention provides for control of breakover by shaping the outer profile of portion 14 with respect to the outer profile of portion 12. According to this invention, the outer surface of portion 14 is so shaped that it will bulge outwardly to a greater extent than the outer surface of portion 12, causing breakover, at a predetermined load. This bulging differential is the result of a bulging instability which occurs in portion 14, as will be described presently.

The FIG. 1 spring includes a tubular elastomeric body, which, in the example illustrated, is reinforced by an embedded coil spring 16. The ends of the body are concave at 18 and 20, so as to form respective seals with respect to the load application platens between which the spring is compressed. In this example, the outer profile of portion 14 is shaped by a single concentric groove. The load versus deflection curve of the FIG. 1 spring is depicted by the curve labelled "Single Contour" in FIG. 3. While this and the other springs illustrated all are cylindrical and are reinforced by embedded coil springs, the invention may be used with these and other forms of tubular elastomeric springs which are not reinforced at all or are reinforced by other means.

Referring now to FIGS. 6-10, some cylindrical elastomeric springs are too short, or have such thick walls, that they ordinarily provide only constant or rising spring rates. For example, the spring depicted in FIGS. 6-9 exhibits essentially only a rising rate spring characteristic, which is reflected by the load versus deflection curve depicted in FIG. 10. As this spring is compressed axially from its fully relaxed position of FIG. 6, through the interim deflection positions of FIGS. 7 and 8, and ultimately to its fully compressed position of FIG. 9, the elastomer is deflected under uniaxial compression. As the adjacent undulations thus formed "bottom out," they produce an increasing effective shape factor which tends to cause the progressively increasing or rising spring rate. This process is reflected by points A, B, C and D in FIG. 10, which respectively correspond to the progressive deflection positions of the spring depicted in FIGS. 6-9.

An important aspect of the present invention is that a spring which has only a rising rate, such as that depicted by FIGS. 6-9, or a spring which has only a constant rate, may be adapted to provide both constant and rising rate, as well as satisfactory breakover, by appropriate shaping of the outer profile of the spring. This may be understood by reference to FIGS. 11-16. In this example, the outer profile of the FIG. 6 spring has been contoured in the region generally designated by reference numeral 22 (FIG. 11) to form a single concentric groove which extends along approximately one third of the unloaded length of the spring. When subjected to an axial compressive load, as depicted by FIGS. 11-15, the relatively thinner wall thickness which underlines this groove produces a bulging instability, the occurence of which will be described presently. This causes the load versus deflection curve for the spring to breakover at a predetermined load and deflection coordinate. This coordinate is referenced by letter C in FIG. 16, and corresponds to the spring in the deflection position illustrated in FIG. 13.

Below the breakover coordinate, the spring provides a generally constant spring rate, as reflected by the generally linear form of the curve from point A to points B and C. Above the breakover coordinate, portion 22 first bulges outwardly to a greater extent than the outer surface of the rest of the spring on account of the occurence of the bulging instability just mentioned. Then, as further deflection from point D to point E (FIG. 16) causes these bulges to "bottom out," the spring provides a generally rising rate, such as that already described with respect to the spring depicted in FIGS. 6-9. The deflection positions which respectively correspond to points A-E are illustrated in FIGS. 11-15. It will be appreciated that the spring, through appropriate contouring or other shaping of its outer profile, now provides a spring curve comparable to that depicted in FIG. 3.

Still another important aspect of the present invention is that such shaping also may be used to control breakover, the plateau region and the rising rate region of the spring curve of a cylindrical elastomeric spring which already provides breakover, whether by the process just described or naturally. Referring to FIG. 3, such control may be accomplished by appropriate contouring of the outer profile of the spring. The profiles exemplified by FIG. 3 are: a single contour formed adjacent one end of the spring, a single contour generally similar to that just described but of greater depth, multiple contours, a wide single contour which extends between two enlarged diameter end portions, and a wide single contour which extends from one enlarged end diameter end portion along the entire remaining length of the spring.

As will be apparent from FIG. 3, such profile variations affect the coordinates at which breakover occurs, the spring rate which persists thoughout the plateau region, and the point at which the plateau region terminates and the rising rate region begins. Greater contouring tends to cause breakover to occur at a lower load than that which would otherwise be the case. The magnitude of this reduction seems to be more pronounced as the length and depth of the groove are increased, as reflected by the FIG. 3 plateau regions for the multiple or wide single contours, as compared to that for the single contour. That is to say, the greater the countouring as compared with a single contour, the breakover point and plateau region tend to shift to the right as depicted in FIG. 3. Contouring also appears to affect the transition point from the plateau region to the rising rate region, as well as the shape of the rising rate region. The depth and width of the contour is believed to affect the slope of this transition more than a simple straight wall change in outer diameter.

The shaping of the outer profile of the spring in accordance with the present invention may be concentric with or eccentric to the longitudinal axis of the spring. In those applications where the compressive load is to be applied coaxially, as generally depicted in FIGS. 11-15, the shaping preferably is accomplished concentric with the longitudinal axis of the spring. The spring depicted on FIGS. 1 and 2 is thus shaped. If the compressive load is applied in a non-axial fashion, however, such as would be the case if the spring were used in a trailing arm suspension of lightweight automobiles, vans, or trucks, the spring may be eccentrically shaped to offset the effects of such loading.

As shown in FIG. 2, for example, the outer profile of the spring is shaped in accordance with this invention by forming an annular groove in the second portion 14 of the spring on the outer surface of the elastomeric tube, such groove being positioned along the length of the tube away from its central portion, i.e., the longitudinal center of the groove is positioned between one end of the tube and its longitudinal midpoint. The annular groove spans at least two adjacent coils of coil spring 16 in order to achieve the desired bulging instability in the second portion of the tube and the resultant force versus deflection curve, such as is shown in FIG. 3. Typically, the coils of coil spring 16 are positioned in the wall of the elastomeric tube closer to the inner bore of the tube through to the outer most surface of the tube. Advantageously, as shown in the wide single contour spring of FIG. 3 and in the spring of FIG. 11, the annular groove is formed so that it has a substantially flat portion extending along at least a portion of the width of the groove, so that the flat portion of the groove has a substantially constant outside diameter, which, of course, is less than the outside diameter of the first portion of the tube which has not been so-contoured.

Referring now to FIG. 17, the spring may be eccentrically contoured so that its wall thickness varies about its circumference. Under non-axial compression, this eccentric contour tends to equalize the load which is borne by opposite sections of the spring walls. If the relatively larger component load is borne by wall section 24, as would be the case if this wall section were nearest to the fulcrum of a radial trailing arm suspension linkage, this wall will bear a disproportionally larger amount of load than that which is borne by the opposite wall section 26. This tends to cause unnecessary stiffness and unequal stress distribution in the spring. The eccentric contouring of the spring, however, which results in section 24 being effectively thinner than section 26, tends to reduce the resistance of wall section 24 to compression and thus transfers proportionately more load to section 26. The cumulative effects of this force bearing differential tend to equalize the load borne by diametrically opposed portions of the spring, provided the spring is appropriately positioned with respect to the fulcrum of the load platens.

The shaping of the outer profile of the spring as contemplated by this invention may be accomplished by any suitable process. For example, a cylindrical elastomeric spring may be preformed and then ground to the appropriate contour. Likewise, the spring may be formed with the prescribed shapes using conventional compression molding, transfer molding or injection molding techniques. This invention therefore is not to be limited by the particular shaping technique used and indeed satisfactory results may be obtained through use of shaping techniques other than those specifically mentioned herein. It thus will be recognized that references to "contouring" or "profiling" are not intended to limit application of the present invention to specific processes which involve the removal of preformed material. Indeed, the invention could be used with appropriate injection or compression molding techniques, in which the mold itself provides the prescribed shape, without the requirement of further material removal other than that necessary to satisfy applicable manufacturing tolerances.

Only certain portions of a thick wall spring made in accordance with this invention -- those which are shaped in accordance with the present inventions -- exhibit the bulging instability which manifests itself as breakover and hence the plateau region, as shown (FIG. 3). In the case of a thin wall spring which naturally has a breakover, portions of it already exhibit such bulging instability. Shaping, however, accentuates the bulging tendencies of the shaped portions of such a spring. In either case, the remaining portions of the spring which are not so shaped exhibit no significant bulging instability tendencies. Indeed, they remain in essentially uniaxial compression throughout all of the deflection positions of the spring.

Figure 5:
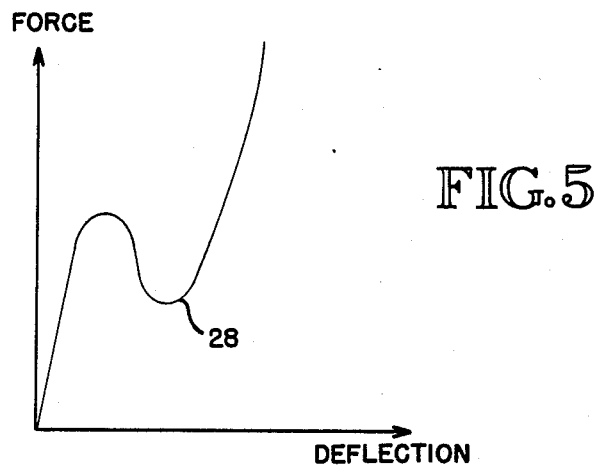
FIG. 5 is a graph of load versus deflection of the FIG. 4 segment.
Figure 6:
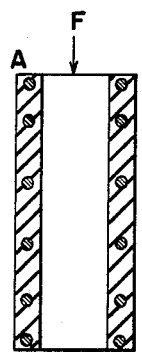
FIGS. 6-9 are schematics depicting axial compression of a straight sided cylindrical elastomeric spring with side walls too thick to permit breakover.
Figure 7:
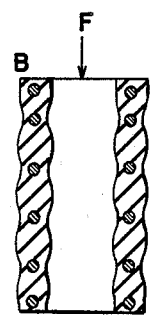
Figure 8:
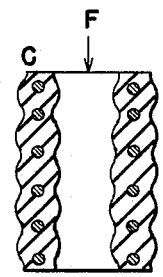
Figure 9:
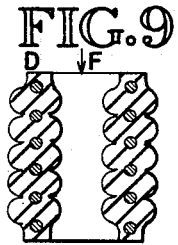
Figure 10:
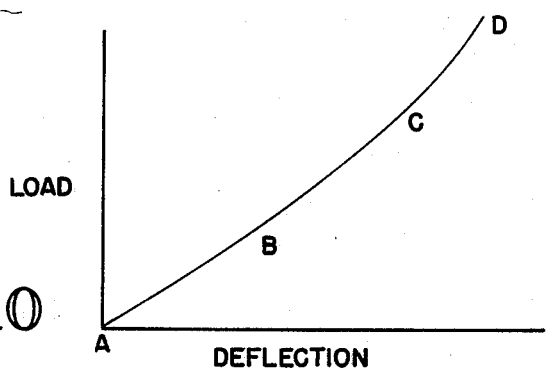
FIG. 10 is a graph of load versus deflection of the FIGS. 6-9 spring.

Each of those portions of a spring which are shaped in accordance with this invention has a force versus deflection curve such as that depicted in FIG. 5. Unlike the FIG. 3 curve, the FIG. 5 curve has a region 28 of negative slope. This is indicative of the occurence of a bulging instability within the shaped portion of the spring. In the case of a reinforced spring, such as that depicted in FIG. 1, the instability occurs at the shaped body portions between adjacent coils of coil spring 16. If more than one such intracoil body segment is shaped, depending upon the extent of the contouring, the intracoil body segments involved tend to reach the point of bulging instability sequentially. Consequently, the cumulative effects of such instability occurrences appear as a plurality of the FIG. 5 force versus deflection curves. When superimposed upon one another, these form a composite force versus deflection curve for the spring which resembles that depicted in FIG. 3. The negative slope portions of the individual curves are offset by the positively sloped deflection curves of the unshaped portions of the spring, as well as those of the other shaped intracoil body segments not then manifesting this mode of deflection. The spring curve obtained therefore has a plateau-like region which corresponds to that depicted in FIG. 3.

Figure 4:
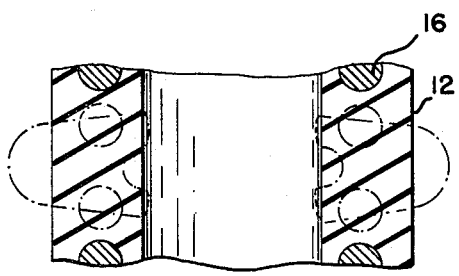
FIG. 4 is a fragmentary longitudinal section, depicting deflection of one intracoil spring segment of the FIG. 1 spring.

Deflection of one such shaped intracoil body segment is depicted in FIG. 4. The body segment experiences localized effects of axial compression which appear as both inward and outward bulging of its inner and outer walls, respectively. The magnitude of the inward bulging of the inner wall is substantially less, however, than outward bulging of the outer wall, and indeed is comparatively negligable by comparison. Inner and outer circumferential or hoop strains in and adjacent to the inner and outer walls cause relatively incompressible material forming the body segment to "flow" radially outward, producing the intracoil lateral bulging and the overall appearance of a rubber coil of spiral configuration. These strains become increasingly positive with increases in axial compression and are distributed axially along the bulging surface so that the maximum strain appears about midway between adjacent coils of the coil spring and are essentially zero adjacent the coils themselves. The "flow" obtained as a result of this strain distribution causes the body segment to deflect momentarily in an unstable manner as if it were buckling.

In addition to the effects of shaping in accordance with this invention, the occurrence of such bulging instability is further controllable so that the plateau region appears when and for the duration desired. In addition to the length, depth, and number of contours formed, additional factors that lend to this control are: the size, number, location, and spacing of the coils of the embedded coil spring, if any; the properties of the material of which the body is composed; the thickness of the body segment wall relative to its length; and the position of the coil spring, if any, with respect to the inner wall of the body segment. The thinner the wall for a given coil spacing, the greater the tendency for the body segment to bulge. Likewise, the thinner the wall thickness and greater the length of the body segment, the greater the tendency for it to bulge. The provision of a coil spring having a diameter corresponding to the diameter of that portion of the spring of minimum wall thickness will have similar effects.

The number of active coils, coil diameter, and length of the body are additional control factors. ("Active coils" mean all but the end coils, which constitute inactive coils.) For example, the greater the number of active coils or the greater the spacing between the coils, the greater the tendency of the body segment involved to undergo a bulging instability. If the number of active coils is excessive, however, the body is in essence divided into so many body segments that it tends to shift in assymetric deformation conditions unpredictably. Too few active coils engendered by excessive coil spacing, on the other hand, promotes assymetric buckling within the individual segments.

In those applications including a reinforced body, such as that depicted in FIGS. 1-2, the wire diameter or cross-sectional size of the individual coils of the coil spring 16 is still another control factor. In the absence of sufficient reinforcement due to inadequate coil diameter, the body tends towards assymetric buckling depending upon its length, in accordance with well known principles of columnar loading. If its individual coils are too large in diameter, however, the coil spring assumes a greater proportion of the load carrying capacity of the spring and the beneficial effects of elastomeric loading may be correspondingly sacrificed.

With further reference to FIG. 1, the spring includes two tabs 30 and 32 which respectively project transversely from the ends of the spring. Each of these tabs includes an arcuate slot which coincides with the outline of the outer edge of the spring. This slot reduces the rigidity of that portion of the end which underlies the tab so that the end is still free to flex during the formation of a seal when the spring end is pressed against a spring platen. Tabs 30 and 32 could be used to index the rotative position of the spring with respect to the spring platens, to provide warranty or verification indicia or securement with the platens once the spring is installed for purposes of warranty verification, or for other suitable purposes related to the identification or use of the spring.

Although one presently preferred embodiment of the invention has been illustrated and described herein, variations will become apparent to one of ordinary skill in the art. Accordingly, the invention is not to be limited to the specific embodiment illustrated and described herein, and the true scope and spirit of the present invention are to be determined by reference to the appended claims.

The embodiments of the invention in which an exclusive property or privilege is claimed are defined as follows:

1. A spring, comprising: an elastomeric tube having a wall sufficient to enable said tube to be deflected by an axial load as a free-standing column and a coil spring embedded in said tube wall and extending along the length of said tube; said tube comprising first and second traverse portions, through each of which extends a generally cylindrical inner bore, said first portion having a generally straight outer profile; and the outer surface of said second portion being provided with an annular groove, the length of which spans at least two adjacent coils of said coil spring, said annular groove being positioned along the length of said tube between one end and the mid-point thereof and at least a portion of the width of said groove having a substantially constant outside diameter less than the outside diameter of said first portion; at least said second portion being unconfined and said annular groove being so-shaped that the middle portion of said second portion bulges outwardly more than the rest of said tube, while remaining out of contact with the rest of said tube, until said second portion buckles, without causing said tube as a whole to undergo columnar buckling, in response to a certain axial load on said tube; said tube having a load versus deflection curve which breaks over from a constant rate into a plateau region essentially simultaneously with said second portion buckling and then to a rising rate; said breakover being controllable in accordance with the shape of said second portion.

2. The spring of claim 1, wherein said rising rate is related to the shape of said second portion, whereby said rising rate is controllable in accordance with the shape of said second portion.

3. The spring of claim 1, wherein said tube has a longitudinal axis, and said annular groove is concentric with said axis.

4. The spring of claim 1, wherein said tube has a longitudinal axis, and said annular, groove is eccentric with said axis.

5. The spring of claim 1, wherein at least one end of said tube includes contoured end sealing means.

6. The spring of claim 1, wherein a third transverse portion of said tube, spaced from said second portion, is unconfined and is so shaped, externally that the middle portion of said third portion also bulges outwardly more than the rest of said tube, other than said second portion, while remaining out of contact with the middle portion of said second portion and the rest of said tube until said third portion buckles essentially simultaneously with said second portion, without causing said tube as a whole to undergo columnar buckling, in response to a certain axial load on said tube.

7. The spring of claim 1, wherein said second portion has a length sufficient to keep said second portion out of bulging contact with the rest of said tube until after said second portion buckling occurs.

8. The spring of claim 1, wherein said plateau region is related to the shape of said second portion, whereby said plateau region is controllable in accordance with the shape of said second portion.

9. The spring of claim 1, wherein said second portion has a length sufficient to keep said second portion out of bulging contact with the rest of said tube until after said second portion buckling occurs.

10. A spring, comprising: an elastomeric tube having a wall sufficient to enable said tube to be deflected by an axial load as a free-standing column and a coil spring embedded in said tube wall and extending along the length of said tube; said tube comprising first and second traverse portions, through each of which extends a generally cylindrical inner bore, said first portion having a generally straight outer profile; and the outer surface of said second portion being provided with an annular groove, the length of which spans at least two adjacent coils of said coil spring, the longitudinal center of said annular groove being positioned along the length of said tube between one end and the mid-point thereof and at least a portion of the width of said groove having a substantially constant outside diameter less than the outside diameter of said first portion; at least said second portion being unconfined and said annular groove being so-shaped that the middle portion of said second portion bulges outwardly more than the rest of said tube, while remaining out of contact with the rest of said tube, until said second portion buckles, without causing said tube as a whole to undergo columnar buckling, in response to a certain axial load on said tube; said tube having a load versus deflection curve which breaks over from a constant rate into a plateau region essentially simultaneously with said second portion buckling and then to a rising rate; said breakover being controllable in accordance with the shape of said second portion.

11. The spring of claim 10, wherein said rising rate is related to the shape of said second portion, whereby said rising rate is controllable in accordance with the shape of said second portion.

12. The spring of claim 10, wherein said tube has a longitudinal axis, and said annular groove is concentric with said axis.

13. The spring of claim 10, wherein said tube has a longitudinal axis, and said annular, groove is eccentric with said axis.

14. The spring of claim 10, wherein at least one end of said tube includes contoured end sealing means.

15. The spring of claim 10, wherein a third transverse portion of said tube, spaced from said second portion, is unconfined and is so shaped externally that the middle portion of said third portion also bulges outwardly more than the rest of said tube, other than said second portion, while remaining out of contact with the middle portion of said second portion and the rest of said tube until said third portion buckles essentially simultaneously with said second portion, without causing said tube as a whole to undergo columnar buckling, in response to a certain axial load on said tube.

16. The spring of claim 10, wherein said plateau region is related to the shape of said second portion, whereby said plateau region is controllable in accordance with the shape of said second portion.

* * * * *